United States Patent [19]

Walters

[11] Patent Number: 4,485,416
[45] Date of Patent: Nov. 27, 1984

[54] AUTOMATIC REVERSING MECHANISM FOR A MAGNETIC-TAPE APPARATUS

[75] Inventor: Robertus A. T. J. Walters, Eindhoven, Netherlands

[73] Assignee: U.S. Philips Corporation, New York, N.Y.

[21] Appl. No.: 398,460

[22] Filed: Jul. 14, 1982

[30] Foreign Application Priority Data

Jul. 24, 1981 [NL] Netherlands ............... 8103506

[51] Int. Cl.³ ............... G11B 19/06; G11B 15/13; G11B 15/30
[52] U.S. Cl. ............... 360/74.2; 242/191; 360/96.3
[58] Field of Search ............... 360/74.2, 72.1, 72.2, 360/72.3, 73, 74.1, 74.3, 96.3; 242/191, 201

[56] References Cited

U.S. PATENT DOCUMENTS 4,159,492  6/1979  Ban et al. ............... 360/74.1
4,172,231 10/1979  d'Alayerole Costemore d'Arc et al. ............... 360/72.3
4,177,488 12/1979  Sakai ............... 360/72.3
4,195,319  3/1980  Ida ............... 360/72.3
4,210,944  7/1980  Fushimi et al. ............... 360/74.2
4,333,115  6/1982  Junio ............... 360/74.2
4,347,538  8/1982  Klank ............... 360/74.2
4,399,355  8/1983  Satah et al. ............... 360/72.3
4,404,611  9/1983  Demenus ............... 360/74.1

Primary Examiner—Aristotelis M. Psitos
Attorney, Agent, or Firm—David R. Treacy

[57] ABSTRACT

In a magnetic-tape apparatus having two winding mandrels journalled in a frame, and a drive system whose direction of rotation is reversible for the transport of the magnetic tape in two opposite directions, switching means for the drive system can be actuated by a detection system which detects a stoppage of both or one of the winding mandrels while the apparatus is in operation. The detection system comprises two plates which are pivotally mounted coaxial with one mandrel, a respective one of the plates being frictionally coupled to each mandrel.

6 Claims, 3 Drawing Figures

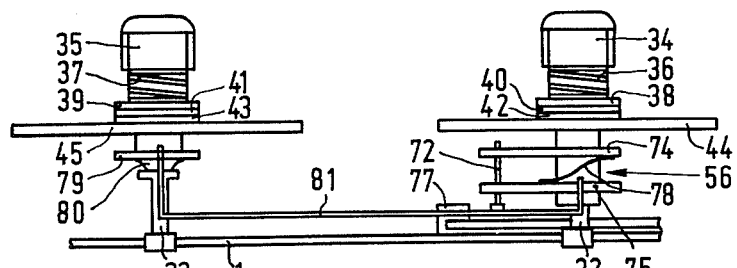
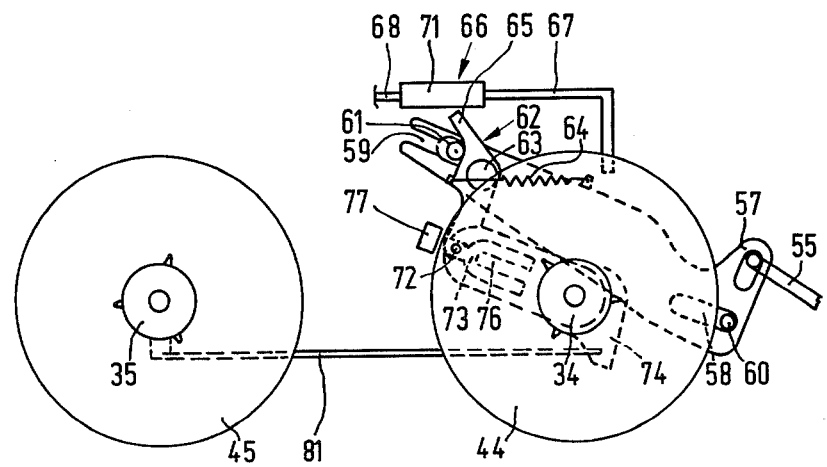

AUTOMATIC REVERSING MECHANISM FOR A MAGNETIC-TAPE APPARATUS

BACKGROUND OF THE INVENTION

The invention relates to a magnetic-tape apparatus which comprises a frame; two winding mandrels journalled in said frame; two capstans and associated pressure rollers; a drive mechanism whose direction of rotation is reversible to permit the transport of the magnetic tape between the two winding mandrels in a first direction or in a second, opposite direction during recording and/or playback; switching means for reversing the direction of rotation of the drive mechanism; and a detection system which is coupled to a winding mandrel for detecting a stoppage of the winding mandrel while the apparatus is still in operation and for actuating the switching means in the event of such stoppage. The detection system comprises an elongate member which carries a pin and is continuously reciprocated by the drive mechanism while the apparatus is in operation. The detection system also includes a detection plate which is frictionally coupled to the winding mandrel and has a substantially U-shaped slot in which the pin slidably engages.

A magnetic-tape apparatus of this type is known from U.S. Pat. No. 4,159,492. This known apparatus is of the so-called "reverse-type" and is intended for moving the magnetic tape in two opposite directions during recording and/or playback. In the known apparatus the detection system is arranged underneath only one of the winding mandrels and is coupled to this winding mandrel only. As a result of this it is possible to detect a stoppage of only the relevant winding mandrel. In this known apparatus the detection system cannot detect directly a stoppage of the other winding mandrel. Yet the known apparatus permits the detection of a stoppage of the magnetic tape as a result of the end of the tape being reached in both directions of transport. This is because in this case it is always ensured that, regardless of the direction of transport of the magnetic tape, the winding mandrel underneath which the detection plate is arranged stops. However, in practice it is not uncommon that a reversal of the direction of rotation of the drive mechanism is required without the two winding mandrels being stationary. This happens specifically if between the two winding mandrels tape-spillage occurs, generally as a result of an incomplete tape transport between the active capstan and the winding mandrel which takes up the tape. In the known apparatus this may happen if the take-up winding mandrel is the winding mandrel underneath which no detection plate is arranged.

SUMMARY OF THE INVENTION

It is an object of the invention to construct the detection system of a magnetic tape apparatus of the type mentioned in the opening paragraph in such a way that detection of a stoppage of the two winding mandrels is effected separately for each of said mandrels.

According to the invention the detection system comprises two such detection plates arranged underneath a first one of the winding mandrels, which plates both cooperate with said pin and are frictionally coupled one to the first and the other to the second winding mandrel and which are both arranged to be pivotable about the axis of rotation of the first winding mandrel. Thus, the direction of tape transport can be reversed not only when the two winding mandrels are stopped but also if one of the two winding mandrels is stopped. This makes it possible, regardless of the direction of tape transport, for tape transport to continue if the take-up mandrel stops during recording and/or playback, which may, for example, occur if the take-up reel jams. This happens frequently in the case of magnetic-tape cassettes, but the situation may also occur in the reel-to-reel magnetic-tape equipment. Especially in equipment in which the tape transport cannot be checked constantly, as for example in magnetic-tape cassette equipment used in cars, the construction in accordance with the invention is of great advantage. It is of further advantage that the construction in accordance with the invention is comparatively compact and simple.

In a preferred embodiment of an apparatus in accordance with the invention one of the detection plates is frictionally coupled to the second winding mandrel via a connecting rod and a frictional coupling plate arranged underneath the second winding mandrel. This provides an effective coupling between the relevant detection plate and the second winding mandrel.

In a further preferred embodiment of an apparatus in accordance with the invention the slot in each detection plate extends to a point near the outer periphery of the detection plate. In this way the pin can be positioned correctly in the rest position, despite the presence of two detection plates.

Furthermore, it is then of advantage if the frame comprises a stop portion for the pin, which stop portion is situated near the outer periphery of the detection plates.

An embodiment of the invention will be described in more detail, by way of example, with reference to the drawing.

BRIEF DESCRIPTION OF THE DRAWINGS

FIG. 2 is a side view of the two winding mandrels and the parts situated underneath them;

FIG. 3 is another schematic plan view of those parts of the apparatus which are relevant to the present invention.

Figure 1:
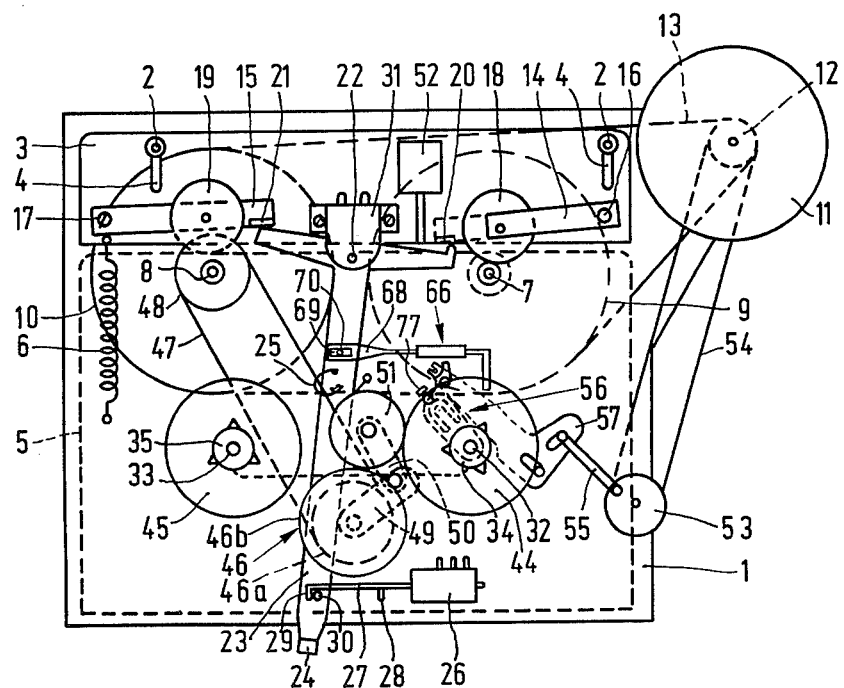
FIG. 1 is a schematic plan view of a magnetic-tape apparatus in accordance with the invention.

The magnetic tape apparatus in accordance with the invention shown in FIG. 1 comprises a frame 1, on which guide pins 2 are arranged which by cooperation with slots 4 guide a supporting plate 3. The guidance is such that the supporting plate 3 can be moved rectilinearly. forwards and backwards. In order to move the supporting plate in a forward direction towards a cassette 5 which is shown positioned on the frame 1, a spring 6 is connected between the supporting plate 3 and the frame 1. In the frame 1 two capstans 7 and 8 are arranged. Underneath the frame flywheels 9 and 10 are rigidly connected to the capstans 7 and 8 respectively. An electric motor 11 is also mounted on the frame 1, which motor forms part of the drive system of the apparatus. The motor is equipped with a pulley 12, around which a belt 13 passes. The belt also engages in a circumferential groove in each of the two flywheels 9 and 10 so that the motor 11 drives the flywheels 9 and 10 in the same direction.

Levers 14 and 15 are pivotally arranged on the supporting plate 3. The levers are pivotable about pins 16 and 17 respectively and carry pressure rollers 18 and 19, respectively, which rollers are spaced from the pins and are freely rotatable. The free ends of the levers are provided with upstanding lugs 20 and 21 respectively.

A pin 22 is arranged on the frame 1, about which pin a T-shaped lever 23 is pivotable. The free ends of the two short lateral arms of the lever 23 engage the lugs 20 and 21. The free end of the longitudinal arm of the lever is provided with an actuating button 24. The lever 23 is urged into one or the other of two end positions by an over-center spring 25. These end positions are determined by an electrical switch 26, of which an arm 27 can be moved longitudinally in reciprocal directions over a limited range. For this purpose the arm 27 comprises two projections 28 and 29. FIG. 1 shows the lever 23 urged into a stable left-hand end position by the over-center spring 25, with a pin 30 on the lever bearing against the projection 29. The switch 26 changes over the motor 11, whose direction of rotation is reversible, and the switch consequently forms part of the switching means for reversing the direction of rotation of the drive system of the apparatus.

In the situation shown in FIG. 1 the pressure roller 18 presses a magnetic tape accommodated in the cassette 5 against the capstan 7. When the drive motor 11 is switched on, the magnetic tape will consequently be fed to the right. On the supporting plate 3 a magnetic head 31 is arranged, over which the magnetic tape passes during the recording and/or reproduction of signals. Since the over-center spring 25 maintains the lever 23 in a pivoted position as shown in FIG. 1, the other pressure roller 19 remains spaced from the capstan 8.

Spindles 32 and 33 of winding mandrels 34 and 35 (see FIG. 2) are journalled in the frame 1. Underneath the winding mandrels compression springs 36 and 37 are arranged around the respective spindles 32 and 33, which springs press at their upper ends against the winding mandrels and their lower ends against rings 38 and 39 respectively. These rings are rotatable with the spindles but are movable axially relative thereto. Underneath the rings 38 and 39 are annular friction plates 40 and 41 respectively, whose upper sides bear against the rings 35 and 39 and whose lower sides bear against shoulders 42 and 43 on gear wheels 44 and 45 respectively, which concentrically and freely surround the respective spindles 33 and 32. The gear wheels 44 and 45 may be made of a plastic material. The friction plates 40 and 41 each form a slip coupling between the gear wheel 44, 45 and the associated winding mandrel 34 and 35 respectively. These slip couplings enable the individual winding mandrels to be stopped while the gear wheels continue to be rotated by the drive system.

In addition, a drive wheel 46 is rotatably journalled on the frame 1. The drive wheel 46 is driven by means of a belt 47, which passes around a pulley 48 which is coaxial with the capstan 8 and is driven by the flywheel 10. The drive wheel 46 comprises a pulley 46a, around which the belt 47 passes, and, situated above the pulley 46a a gear wheel 46b. The two wheels 46a and 46b are rigidly and coaxially connected to each other. An arm 49 is pivotable about the axis of rotation of the drive wheel 46 and is pivotally coupled to an arm 50. At the end of the arm 50 a gear wheel 51 is rotatably mounted. The arms 49 and 50 are urged towards each other by a spring, not shown.

In this way the gear wheel 51 is gently urged into mesh with the gear wheel 46b as in FIG. 1. If the pulley 48 is driven in the clockwise direction (as viewed in FIG. 1) the arms 49 and 50 are subjected to a torque in the clockwise direction due to the friction between the relevant parts, so that the gear wheel 51 is brought into mesh with the gear wheel 44. Since the magnetic-tape transport is determined by the rotation of the capstan 7, slip occurs between the gear wheel 44 and the winding mandrel 34, the slip being permitted by the friction plate 40.

If, in a manner to be described hereinafter, the T-shaped lever 23 is pivoted in the anti-clockwise direction and is urged by the over-center spring 25 into the right-hand end position, the free end of the right-hand lateral arm of the T-shaped lever presses against the lug 20 and pivots the lever 14 in the clockwise direction. As a result of this, the pressure roller 18 is moved away from the capstan 7. Simultaneously the lever 15 is pivoted to move the pressure roller 19 against the capstan 8. At this instant also the pin 30 on the lever 23 also presses against the projection 28 so that the switch 26 causes the direction of rotation of the motor 11 to be reversed. As a result of this, the capstan 8 is driven in an anti-clockwise direction and due to frictional torque on the arm 19, the gear wheel 51 is moved from the gear wheel 44 to the gear wheel 45. By means of a switch 52 on the supporting plate 3 the channels of the magnetic head 31 are changed over at the same time as the lever 23 is pivoted.

As already stated in the foregoing, it is possible to obtain a pivotal movement of the lever 23 and thus a reversal of the direction of the tape transport during the recording and/or playback of signals by actuation of the actuating button 24. It will now be explained how in the magnetic-tape apparatus in accordance with the invention it is also possible to obtain an automatic reversal of the direction of tape transport. For this purpose a drive wheel 53 is rotatably journalled in the frame 1, which wheel is driven by the gear wheel 12 via a belt 54. A crank arm 55 is connected to the drive wheel 53 eccentrically of the axis of rotation of said drive wheel. Thus, during operation of the apparatus the crank arm reciprocates continuously. As is shown in particular in FIGS. 2 and 3, a detection system 56 is arranged underneath the gear wheel 44, which system serves for detecting a stoppage of the winding mandrels 34 and 35 while the apparatus is still in operation. The detection system 56 comprises an elongate plate member 57, which is constantly reciprocated by the crank arm 55 during operation, the direction of movement of the member 57 being tangential relative to the spindle 32. The member 57 has two slots 58 and 59 which cooperate with pins 60 and 61 respectively on the frame 1 to provide a rectilinear guidance of the member 57. The member 57 carries a switching arm 62 which is pivotally connected to the member 57 by a spindle 63. Further, the arm 62 is coupled to the member 57 by a tension spring 64 arranged near the spindle 63. The spring 64 tends to pivot the arm 62 in anti-clockwise direction. The arm 62 has a free end 65 which is adapted to cooperate with a change-over mechanism 66 which is arranged on the frame 1 and which comprises a portion 67 which cooperates with the free end 65 and a portion 68 which cooperates with the lever 23. The portion 68 has a slot 69 in which a pin 70 on the lever 23 engages. Between the portions 67 and 68 the change-over mechanism 66 comprises the actual change-over portion 71, by means of which, if a force is exerted on the portion 67 towards the lever 23, the change-over mechanism 66 presses against the pin 70 with one end of the slot 69 and the other end of the slot 69 alternately. The mechanism is constructed so that manual change-over by means of the actuating button 24 is always possible. The force exerted on the portion 67 may be produced by the free end 65 of the arm 62. At its other end the arm 62 carries a pin 72 which extends substantially parallel to the spindle 32. The pin engages in slots 73 formed one in each of two plates 74 and 75 which are disposed one above the other and which are hereinafter referred to as "detection plates". The slots 73 are substantially U-shaped and each bound an intermediate portion 76 of the respective plate, which portion extends radially relative to the spindle, 32. Moreover, each slot further extends with a radial outward part from the curved part situated between the two straight parts towards the periphery of the detection plates 74 and 75 respectively. In the position shown in FIG. 3 the pin 72 is situated in this outward part of each slot 73. A further outward movement of the pin 72 is limited by a stop portion 77 on the frame 1. The detection plate 74 is urged against a shoulder on the spindle 32 by a spring 78 arranged between the two detection plates 74 and 75. As a result of this, the detection plate 74 is frictionally coupled to the winding mandrel 34. Since the two detection plates 74 and 75 are pivotable about the spindle 32 the winding mandrel 34, as it rotates, exerts a torque on the plate 74. This is attended by friction. Underneath the winding mandrel 35 is a frictional coupling plate 79 which is urged by a spring 80 against a portion of the spindle 33 of increased diameter. The two plates 79 and 75 are interconnected by a connecting rod 81. Hence, the detection plate 75 is frictionally coupled to the winding mandrel 35.

During rotation of the winding mandrel 34 in a clockwise direction a similarly directed torque is exerted on the detection plate 74. At the same time, owing to the continuously driven drive wheel 53 and the crank arm 55, the member 57 and with it the arm 62 are reciprocated so that the pin 72 moves back and forth along the lower of the two straight parts of the slot 73 and the outward part in the plate 74, as viewed in FIG. 3. Owing to the presence of the magnetic-tape cassette 5 the winding mandrel 35 is rotated simultaneously with the mandrel 34 during recording and/or playback, which rotation results in a clockwise directed torque being exerted on the coupling plate 79. Via the connecting rod 81 a similarly directed torque is also exerted on the detection plate 75, so that the pin 72 also moves back and forth along the respective straight part and outward part of the slot 73 in the plate 75. During the reciprocating movement the free end 65 of the arm 62 remains in substantially the same position relative to the member 57 owing to the torque exerted on the arm by the spring 64. During an anti-clockwise rotation of the winding mandrels 34 and 35 a similar movement of the arm 62 is obtained, except that the pin 72 is moved along the upper of the two straight parts and the outward part of the slot 73 in each of the plates 74 and 75.

When the torque exerted on the detection plates 74 and 75 by the winding mandrels is removed, which may, for example, occur when the end of the magnetic tape is reached, each plate will occupy the position shown in FIG. 3 during the return movement from stop position 77 of the pin 72 in the outward part of the slot 73 in each plate and the pin 72 will be pressed against that part of the edge of the intermediate portion 76 of the respective plate which is remote from the spindle 32, owing to the continuous reciprocating movement of the member 57. A continued movement of the member 57 downwards to the right in FIG. 3 consequently results in the arm 62 being pivoted in the clockwise direction. This pivotal movement of the arm 62 causes the spring 64 to be urged past the dead center position at the axis of the spindle 63, so that the spring 64 now exerts a clockwise instead of an anti-clockwise torque on the arm 62. The arm 62 is thereby set to a change-over position in which its free end 65 can engage the portion 67 of the change-over mechanism 66. Owing to the action of the change-over mechanism 66 the lever 23 is pivoted to the right-hand end position, so that in the manner described in the foregoing, via the change-over mechanism and the lever 23 the detection of the stoppage of both or one of the winding mandrels by the detection system 56 actuates the switching means constituted by the switch 26, which results in a reversal of the direction of rotation of the drive system in the manner described in the foregoing. When the member 57 is subsequently moved upwardly to the left in FIG. 3 the pin 72 is moved against the stop portion 77, so that the arm 62 is pivoted back in an anti-clockwise direction and the spring 64 will again exert a torque on the arm in this direction. Thus, the coupling between the change-over mechanism 66 and the free end 65 of the arm 62 is interrupted immediately after change-over of the switch 26.

In the apparatus in accordance with the invention a reversal of the direction of tape transport is obtained in a very favorable manner, not only if the two winding mandrels 34 and 35 are stationary but also if one of the two winding mandrels is stationary. Since the detection plates 74 and 75 can each detect stopping of the winding mandrel 34 or 35 respectively, the associated detection plate will be positioned as shown in FIG. 3 also if only one of the two winding mandrels is stationary, so that the pin 72 is moved against the intermediate portion 76, of the respective detection plate, which results in the change-over described in the foregoing. This change-over occurs not only if the end of tape is reached, in which case both winding mandrels are stopped, but also if the winding mandrel which functions as take-up mandrel stops because the tape transport to the capstan is impeded. This happens frequently in magnetic-tape cassettes if the tape rubs against the cassette housing or if the tape movement in the cassette is impeded in some other way. However, this may also happen in magnetic tapes moving between reels if the rotation of the take-up reel is impeded. This favourable action may then also prevent the occurrence of tape-spillage. Instead of the connecting rod 81, other means may be utilized to connect the coupling plate 79 to the detection plate 75, such as gear wheels, belts and the like.

The scope of the invention includes not only the embodiment described but also all variants thereof.

What is claimed is:

1. A magnetic-tape apparatus which comprises
a frame,
two winding mandrels journalled in said frame about respective axes of rotation,
two capstans and associated pressure rollers,
a drive mechanism for said capstans and mandrels whose direction of rotation is reversible to permit the transport of the magnetic tape between the two winding mandrels in a first direction or in a second, opposite direction during recording and/or playback,
switching means for reversing the direction of rotation of the drive mechanism, and
a detection system which is coupled to one of the winding mandrel, for detecting a stoppage of said one winding mandrel while the apparatus is still in operation and for actuating the switching means in the event of such stoppage, which detection system comprises an elongate member which is continuously reciprocated by the drive mechanism while the apparatus is in operation and which carries a pin, and a detection plate which is frictionally coupled to said one winding mandrel and has a substantially U-shaped slot in which the pin slidably engages, characterized in that the detection system comprises two said detection plates arranged underneath said one of the winding mandrels, which plates both cooperate with said pin and are respectively frictionally coupled to the one and to the other winding mandrel and are both arranged to be pivotable about the axis of rotation of the one winding mandrel.

2. A magnetic-tape apparatus as claimed in claim 1, characterized in that said other detection plate is frictionally coupled to the second winding mandrel by a coupling means comprising a connecting rod and a frictional coupling plate arranged underneath the second winding mandrel.

3. A magnetic-tape as claimed in claim 1 or 2, characterized in that the slot in each detection plate extends to a point near the periphery of the detection plate.

4. A magnetic-tape apparatus as claimed in claim 3, characterized in that the frame comprises a stop portion for the pin, which stop portion is situated near the periphery of the detection plates.

5. A magnetic-tape apparatus which comprises
a frame,
a first and a second winding mandrel each rotatably journalled in said frame about a respective axis of rotation,
a drive mechanism for said mandrels whose direction of rotation is reversible to permit the transport of the magnetic tape between the two winding mandrels in a first direction or in a second, opposite direction during recording and/or playback,
switching means for controlling the drive mechanism, and
a detection system which is coupled to one of the winding mandrels, for detecting a stoppage of said one winding mandrel while the apparatus is still in operation in at least one direction of rotation and for actuating the switching means in the event of such stoppage, which detection system comprises an elongate member which carries a pin and is continuously reciprocated by the drive mechanism while the apparatus is in operation, characterized in that said detection system further comprises actuating means for moving said pin in a given direction responsive to stoppage of rotation of said first mandrel at least when the drive mechanism is operating in one of said directions, and for moving said pin in said given direction responsive to stoppage of rotation of said second mandrel at least when the drive mechanism is operating in the other of said directions, said actuating means comprising:

a detection plate arranged coaxial with said first winding mandrel to be pivotable about the axis of rotation of said first winding mandrel, and having a substantially U-shaped slot bounding an intermediate portion, said pin slidably engaging said slot, and arranged such that in the absence of a torque biasing the detection plate in a direction of rotation, the pin abuts said intermediate portion as said member is reciprocated, a further plate arranged coaxial with said first winding mandrel to be pivotable about the axis of rotation of said first winding mandrel, coupling means for frictionally coupling one of said plates to the second winding mandrel, said coupling means comprising a connecting rod and a frictional coupling plate arranged coaxial with the second winding mandrel, means for directly frictionally coupling the other of said plates to said first winding mandrel, and means, responsive to the cessation of friction-coupled torque to said further plate, for causing said pin to move in said given direction.

6. An apparatus as claimed in claim 5, characterized in that said means for causing said pin to move in said given direction comprises said further plate being a second detection plate.

* * * * *